(12) United States Patent
Pichon et al.

(10) Patent No.: US 11,035,321 B2
(45) Date of Patent: Jun. 15, 2021

(54) ROCKET MOTOR WITH COMPOSITE DIVERGENT NOZZLE SECTION

(71) Applicant: ARIANEGROUP SAS, Paris (FR)

(72) Inventors: Thierry Pichon, Avensan (FR); Xavier Zorrilla, Cars (FR); Ivan Herraiz, Saint-Médard-en-Jalles (FR); Laurent Longueville, Le Pian Medoc (FR)

(73) Assignee: ARIANEGROUP SAS, Paris (FR)

( * ) Notice: Subject to any disclaimer, the term of this patent is extended or adjusted under 35 U.S.C. 154(b) by 220 days.

(21) Appl. No.: 16/311,820

(22) PCT Filed: Jun. 28, 2017

(86) PCT No.: PCT/FR2017/051730
§ 371 (c)(1),
(2) Date: Dec. 20, 2018

(87) PCT Pub. No.: WO2018/002523
PCT Pub. Date: Jan. 4, 2018

(65) Prior Publication Data
US 2019/0203662 A1   Jul. 4, 2019

(30) Foreign Application Priority Data

Jun. 29, 2016 (FR) ...................................... 1656095

(51) Int. Cl.
*F02K 9/97* (2006.01)
*F02K 9/64* (2006.01)

(52) U.S. Cl.
CPC ............... *F02K 9/97* (2013.01); *F02K 9/64* (2013.01); *F02K 9/972* (2013.01); *F05D 2300/10* (2013.01); *F05D 2300/603* (2013.01)

(58) Field of Classification Search
CPC ... F02K 9/64; F02K 9/97; F02K 9/972; F02K 9/976
See application file for complete search history.

(56) References Cited

U.S. PATENT DOCUMENTS 5,445,469 A * 8/1995 Huck .................... F01D 25/243
                                                     403/30
8,281,603 B2 * 10/2012 Johnson ................ F16B 5/0241
                                                     60/799

(Continued)

FOREIGN PATENT DOCUMENTS

EP         2 489 866 A2    8/2012
WO    WO 2015/055924 A1    4/2015

OTHER PUBLICATIONS

International Search Report as issued in International Patent Application No. PCT/FR2017/051730, dated Sep. 5, 2017.

*Primary Examiner* — Todd E Manahan
*Assistant Examiner* — Kyle Robert Thomas
(74) *Attorney, Agent, or Firm* — Pillsbury Winthrop Shaw Pittman LLP (57) ABSTRACT

A nozzle presents a longitudinal axis, includes both a combustion chamber made of metal material and presenting a downstream end, and a diverging portion made of composite material formed by a wall of conical shape extending between an upstream and a downstream end. The upstream end of the composite material diverging portion is connected to the downstream end of the combustion chamber. The nozzle further includes an annular mount made of metal material including a first portion secured to the combustion chamber and a second portion extending beyond the downstream end of the combustion chamber along the longitudinal axis. The upstream end of the composite material diverging portion is fastened to the second portion of the annular mount by a plurality of fastener members, each including a fastener bolt, each fastener bolt passing through the conically-shaped wall of the composite material diverging portion near the upstream end of the wall.

7 Claims, 6 Drawing Sheets

(56) References Cited

U.S. PATENT DOCUMENTS

| | | | |
|---|---|---|---|
| 2003/0136128 A1* | 7/2003 | Groeber | F02K 9/97 |
| | | | 60/771 |
| 2004/0071877 A1 | 4/2004 | Goujard et al. | |
| 2015/0152545 A1 | 6/2015 | Goujard et al. | |
| 2016/0169155 A1* | 6/2016 | Indersie | F02K 1/40 |
| | | | 239/265.11 |

* cited by examiner

ROCKET MOTOR WITH COMPOSITE DIVERGENT NOZZLE SECTION

CROSS REFERENCE TO RELATED APPLICATIONS

This application is the U.S. National Stage of PCT/FR2017/051730 filed Jun. 28, 2017, which in turn claims priority to French Application No. 1656095, filed Jun. 29, 2016. The contents of both applications are incorporated herein by reference in their entirety.

BACKGROUND OF THE INVENTION

The present invention relates to a nozzle comprising a combustion chamber made of metal material with a diverging portion made of composite material formed by a conically-shaped wall, the composite material diverging portion being connected to the downstream end of the combustion chamber.

For parts that are to be used with spacecraft, it is well known to make use of thermostructural composite materials, i.e. composite materials having mechanical properties that make them suitable for constituting structural elements and that have the ability to retain those properties at high temperatures. Such thermostructural materials include in particular carbon/carbon (C/C) composite materials (carbon fiber reinforcement and carbon matrix), and ceramic matrix composite (CMC) materials, e.g. C/SiC (carbon fiber reinforcement and silicon carbide matrix), C/C—SiC (carbon fiber reinforcement and combined carbon and silicon carbide matrix), or indeed SiC/SiC.

Document US 2003/136128 discloses a nozzle having a metal combustion chamber with a diverging portion made of composite material connected to the downstream end of the combustion chamber. In that document, the connection between the downstream end of the combustion chamber and the upstream end of the composite material diverging portion is made by means of a radial flange present on the upstream end of the diverging portion. More precisely, at its upstream end, the conically-shaped wall of the diverging portion is extended radially outwards by a thick annular portion serving to form a radial flange through which a fastener member can be passed for fastening the composite material diverging portion to the downstream end of the combustion chamber.

Nevertheless, that attachment solution presents the drawback of significantly increasing the cost of fabricating the diverging portion because it is necessary to have a portion of extra thickness in the composite material of the diverging portion and because of the additional machining that is required on the extra thickness portion in order to form the flange.

There thus exists a need for nozzles of lighter weight and presenting reduced fabrication costs.

OBJECT AND SUMMARY OF THE INVENTION

To this end, the present invention proposes a nozzle presenting a longitudinal axis and comprising both a combustion chamber made of metal material and presenting a downstream end and also a diverging portion made of composite material formed by a wall of conical shape extending between an upstream end and a downstream end, the upstream end of the composite material diverging portion being connected to the downstream end of the combustion chamber; the nozzle being characterized in that it further comprises an annular mount made of metal material comprising a first portion secured to the combustion chamber and a second portion extending beyond the downstream end of the combustion chamber in the direction of the longitudinal axis of the nozzle, and in that the upstream end of the composite material diverging portion is fastened to the second portion of the annular mount by a plurality of fastener members, each comprising a fastener bolt, each fastener bolt passing through the conically-shaped wall of the composite material diverging portion near the upstream end of said wall.

Thus, the nozzle of the present invention includes a composite material diverging portion, thereby enabling the overall weight of the nozzle to be reduced significantly. In addition, in the nozzle of the invention, the conically-shaped wall constituting the diverging portion is fastened directly to an axially-extending mount secured to the combustion chamber. There is therefore no longer any need to make a portion of extra thickness in the composite material of the diverging portion, nor is there any need to perform specific machining in order to shape a flange in the diverging portion, thereby serving to simplify fabrication of the diverging portion by restricting it to fabricating a single fine wall (of "near net shape"), and consequently serving to reduce the cost of fabricating the diverging portion. Fabrication of diverging portions of the invention is further simplified and rationalized in that their simple conical shape enables preforms that are to form diverging portions to be stacked easily in a single densification oven, thereby enabling the unit cost of fabricating a nozzle to be reduced.

According to a particular characteristic of the nozzle of the invention, the combustion chamber includes a cooling circuit for passing a flow of cooling fluid, the cooling circuit comprising at least a first annular channel for passing a flow of cooling fluid extending along the downstream end of the combustion chamber and in the proximity of the fastener members. The zone of the combustion chamber where it is axially fastened to the diverging portion is thus cooled, thereby enabling the metal portions present in that zone to be maintained at temperatures that are reasonable. It is thus possible to use refractory metal materials, such as TZM molybdenum alloy, for making the fastener members.

According to another particular characteristic of the nozzle of the invention, the combustion chamber includes a cooling circuit in which the first annular channel for passing a flow of cooling fluid is present upstream from the fastener members and in which the cooling circuit includes a second annular channel for passing a flow of cooling fluid that extends along the free end of the second portion of the annular mount, said second annular flow channel being present downstream from the fastener members. The zone of the combustion chamber and of the annular mount where axial fastening is performed with the diverging portion is thus cooled, thereby enabling metal portions present in that zone to be maintained at temperatures that are reasonable. The cooling circuit may also include a plurality of axial ducts communicating with the first and second annular channels, each axial duct being present between two adjacent fastener members. Under such circumstances, the cooling fluid flows around the fastener members, thereby enabling the connection between the combustion chamber and the diverging portion to be maintained at temperatures that are relatively low and to use refractory metal materials, such as TZM molybdenum alloy, for making the fastener members. According to a particular aspect of this cooling circuit, the axial ducts communicating with the first and second annular channels are received in stiffeners that are present on the outside face of the nozzle.

According to another characteristic of the nozzle of the invention, a gasket is interposed between the inside face of the second portion of the annular mount and the outside face of the wall of the diverging portion. This makes it possible to reinforce sealing between those two parts.

BRIEF DESCRIPTION OF THE DRAWINGS

Other characteristics and advantages of the invention appear from the following description of particular embodiments of the invention given as non-limiting examples and with reference to the accompanying drawings, in which.

DETAILED DESCRIPTION OF AN EMBODIMENT

Figure 1:
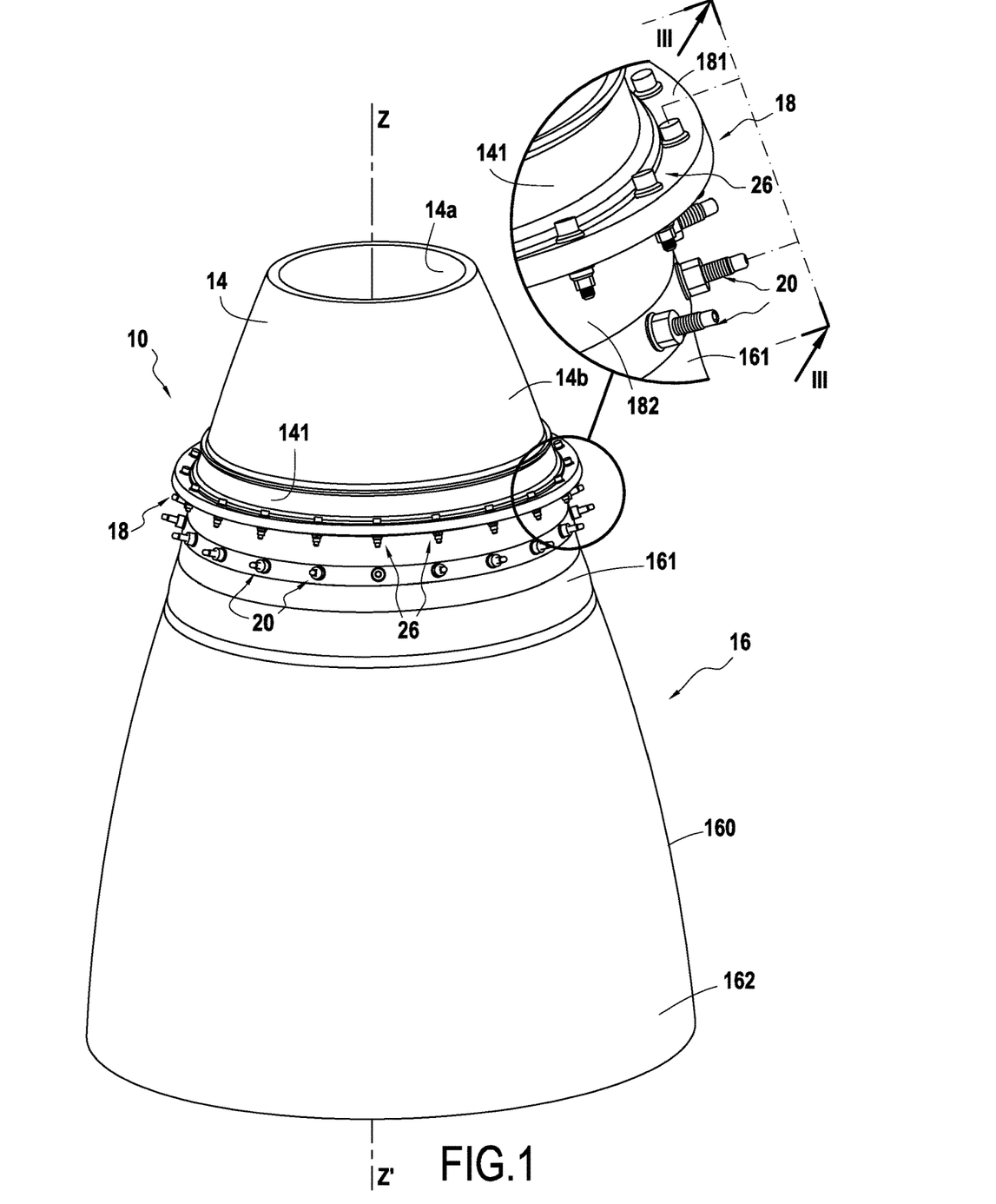
FIG. 1 is a diagrammatic view of a nozzle in an embodiment of the invention.
Figure 2:
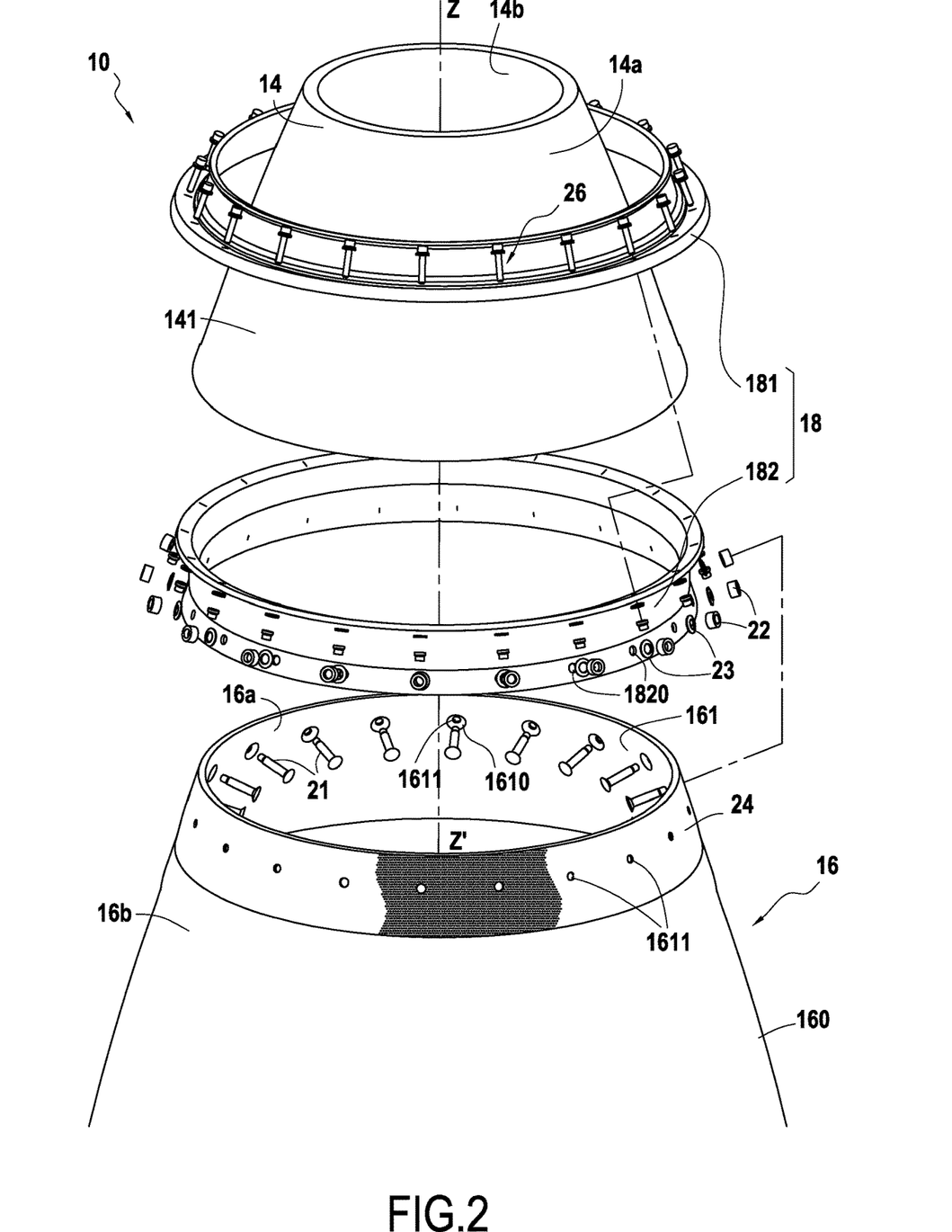
FIG. 2 is a diagrammatic exploded perspective view of the FIG. 1 nozzle.

FIGS. 1 and 2 show a rocket engine nozzle 10 in accordance with an embodiment of the invention. The nozzle 10, of longitudinal axis ZZ', comprises both a combustion chamber 14 made of metal material and presenting a downstream end 141, and also a diverging portion 16 made of composite material formed by a conically-shaped wall 160 extending between an upstream end 161 and a downstream end 162, the upstream end 161 of the composite material diverging portion 16 being connected to the downstream end 141 of the combustion chamber 14. The nozzle 10 also has an annular mount 18 made of metal material, comprising a first portion 181 secured to the combustion chamber 16 and a second portion 182 extending beyond the downstream end 141 of the combustion chamber 14 along the longitudinal axis ZZ' of the nozzle 10. The upstream end 161 of the composite material diverging portion 16 is fastened on the second portion 182 of the annular mount 18 by a plurality of fastener members 20, each comprising a fastener bolt 21 and a nut 22, each fastener bolt 21 passing through the conically-shaped wall 160 of the composite material diverging portion 16 near the upstream end 161 of the wall 160.

Figure 3:
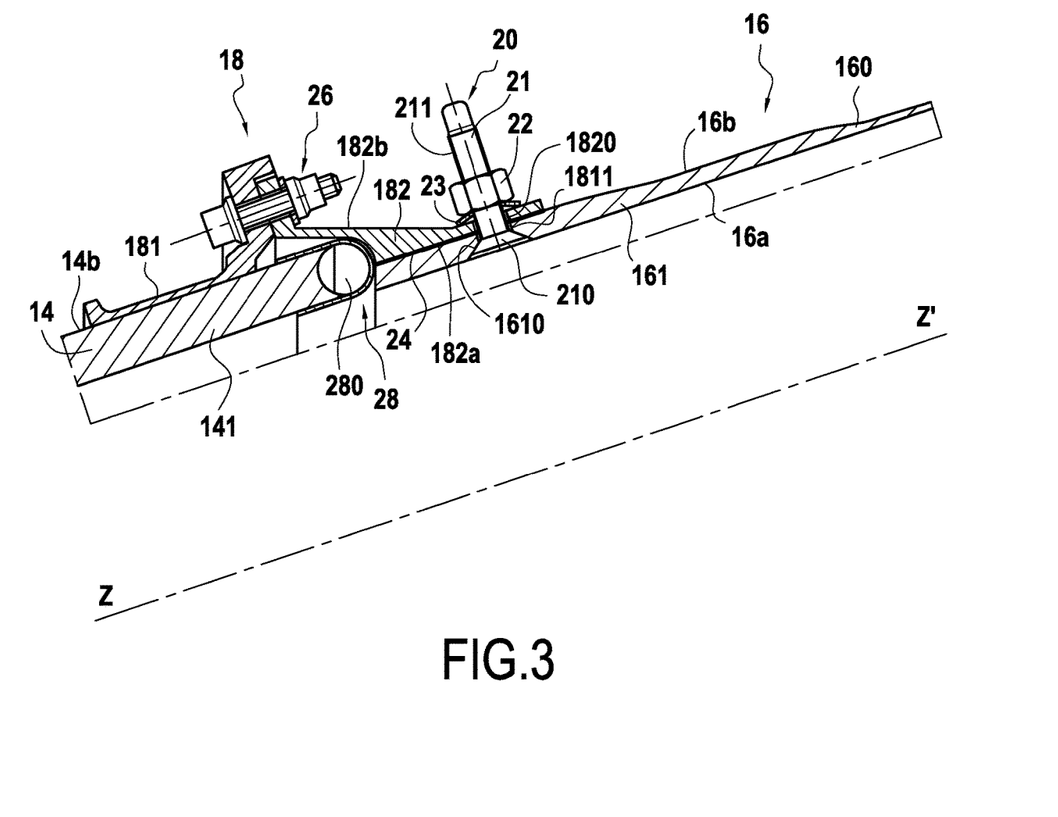
FIG. 3 is a diagrammatic section view showing the connection between the combustion chamber and the diverging portion of the FIG. 1 nozzle.

More precisely, and as shown in FIG. 3, the first portion 181 of the annular mount 18 is fastened on the outside face 14b of the combustion chamber by a metal/metal bond, e.g. made by brazing or by welding. The second portion 182 of the annular mount 18 is fastened to the wall 160 of the diverging portion 16 by fastener members 20 constituted in this example by bolts 21 and corresponding nuts 22. Each bolt 21 has a conical head 210 that is received in a countersink 1610 present in the inside face 16a of the wall 160 of the diverging portion 16, the shank 211 of the bolt 21 passing both through an orifice 1611 present in the wall 160 and extending the countersink 1610, and also through an orifice 1820 present in the second portion 182 of the annular mount 18. A nut 22 is screwed onto the shank 211 beside the outside face 182b of the second portion 182 of the annular mount. As shown in FIG. 3, a spring washer 23 (or Belleville washer) may be interposed between the nut 22 and the outside face 182b of the second portion 182 of the annular mount 18, in particular in order to limit stresses in the composite material of the wall 160 during expansion of the fastener members 20 and of the second portion 182. A gasket 24, e.g. in the form of a graphite sheet, is interposed between the inside face 182a of the second portion 182 of the annular mount 18 and the outside face 16b of the wall 160 of the diverging portion 16 facing the second portion 182.

The second portion 182 of the annular mount 18 is also fastened to the first portion 181 of the annular mount 18 by nut-and-bolt type fastener members 26, the mount 18 thus providing a rigid connection between the combustion chamber 14 and the diverging portion 16.

The downstream end 141 of the combustion chamber also has a cooling circuit 28 for passing a flow of cooling fluid. The cooling circuit 28 in this example comprises an annular channel 280 for passing a flow of cooling fluid, which channel extends along the downstream end 141 of the combustion chamber 14 in the proximity of the fastener members 20.

Figure 4:
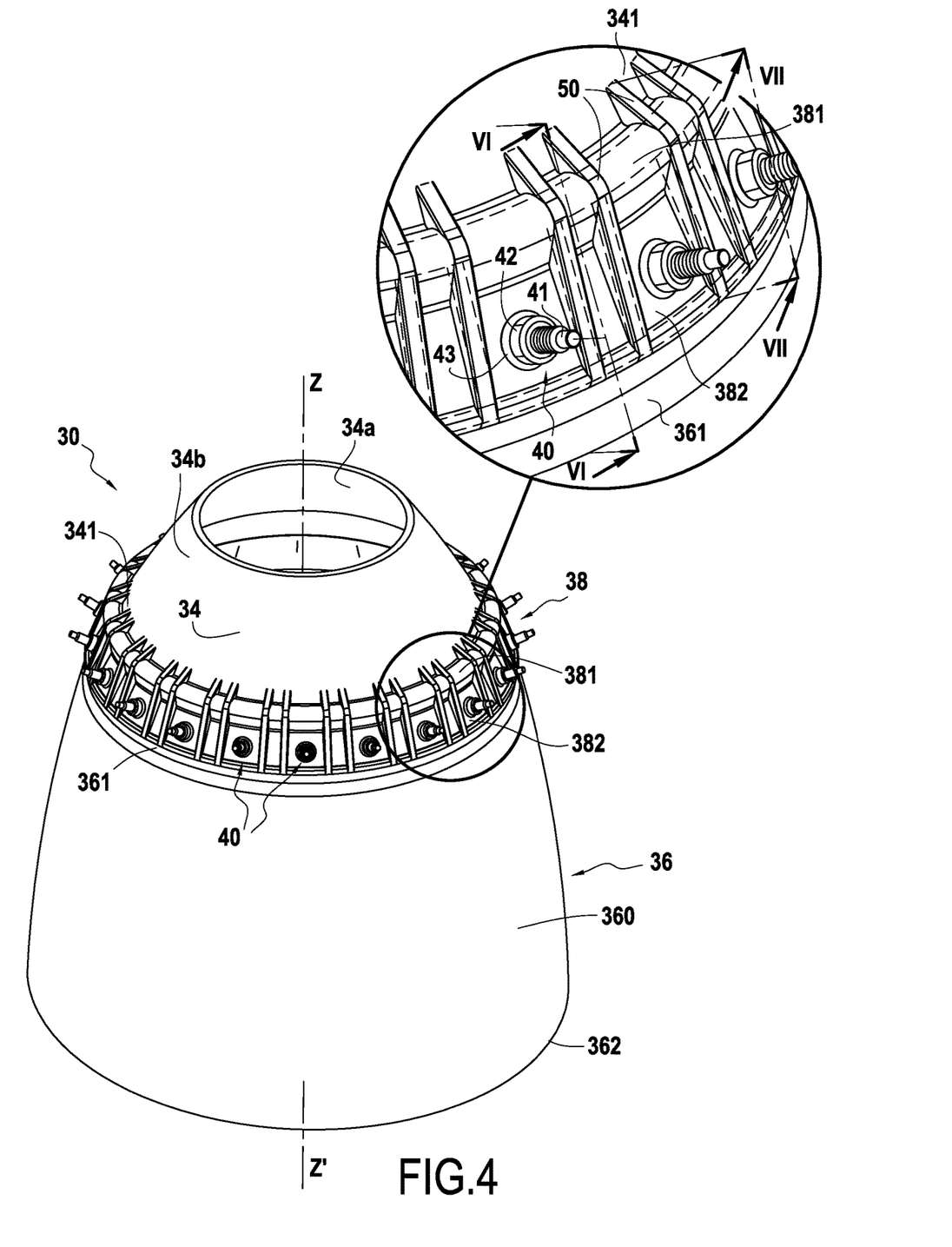
FIG. 4 is a diagrammatic view of a nozzle in another embodiment of the invention.
Figure 5:
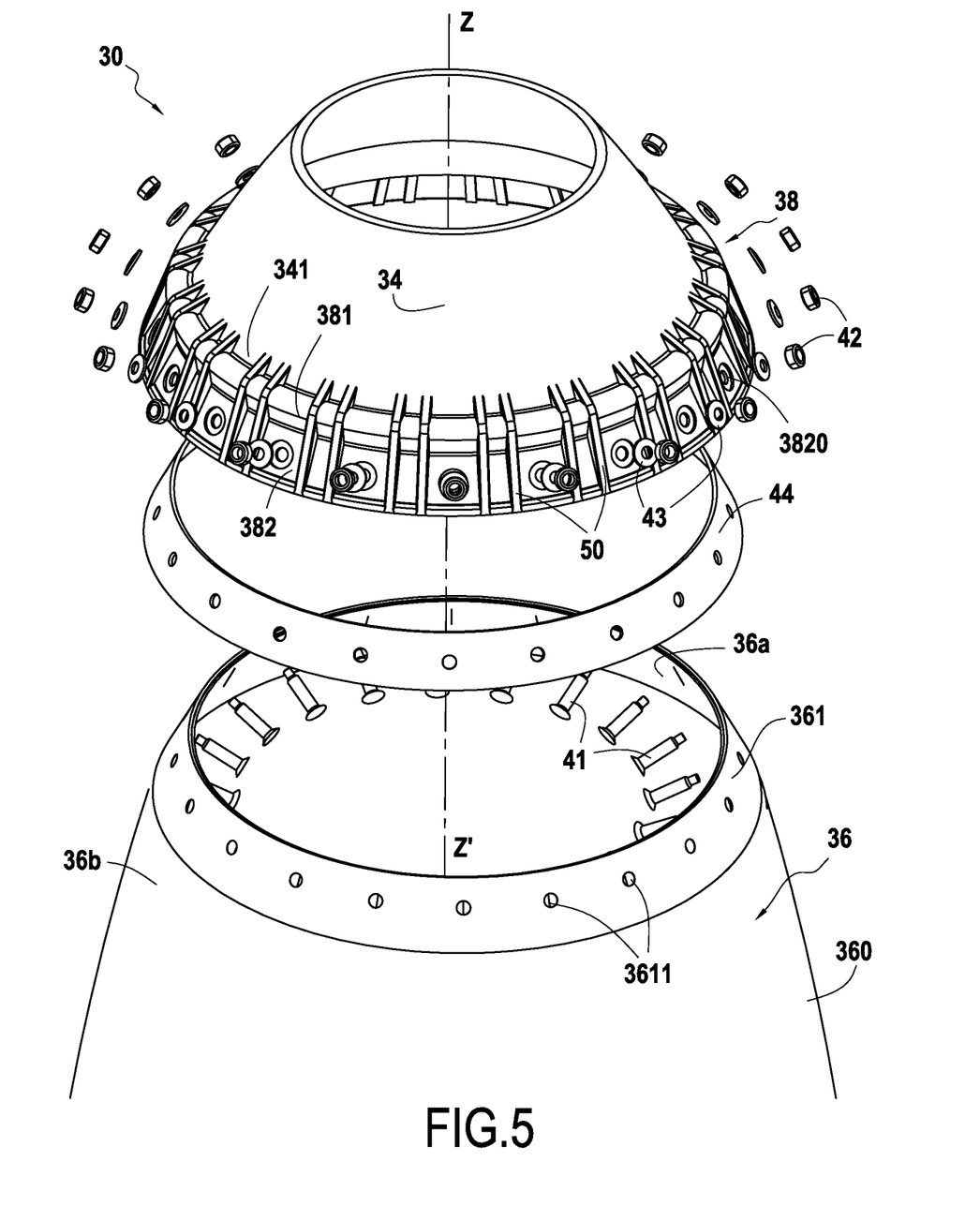
FIG. 5 is a diagrammatic exploded perspective view of the FIG. 4 nozzle.

FIGS. 4 and 5 show another embodiment of a nozzle of the invention that differs from the above-described nozzle 10 in particular in that the annular mount is made to extend the downstream end of the combustion chamber, and in that the cooling circuit has a plurality of channels and pipes for passing a flow of cooling fluid, that extend around the fastener members.

More precisely, in FIGS. 4 and 5, a rocket engine nozzle 30 of longitudinal axis ZZ' comprises both a combustion chamber 34 made of metal material and presenting a downstream end 341, and also a diverging portion 36 made of composite material formed by a conically-shaped wall 360 extending between an upstream end 361 and a downstream end 362, the upstream end 361 of the composite material diverging portion 36 being connected to the downstream end 341 of the combustion chamber 34. The nozzle 30 also has an annular mount 38 made of metal material and comprising a first portion 381 secured to the combustion chamber 16 and a second portion 382 extending the first portion 381 beyond the downstream end 341 of the combustion chamber 34 along the longitudinal axis ZZ' of the nozzle 30. In the presently-described embodiment, the annular mount 38 is made integrally with the combustion chamber 34.

The upstream end 361 of the composite material diverging portion 36 is fastened to the second portion 382 of the annular mount 38 by a plurality of fastener members 40, each comprising a fastener bolt 41 and a nut 42, each fastener bolt 41 passing through the wall conically-shaped wall 360 of the composite material diverging portion 36 near the upstream end 361 of the wall 360.

Figure 6:
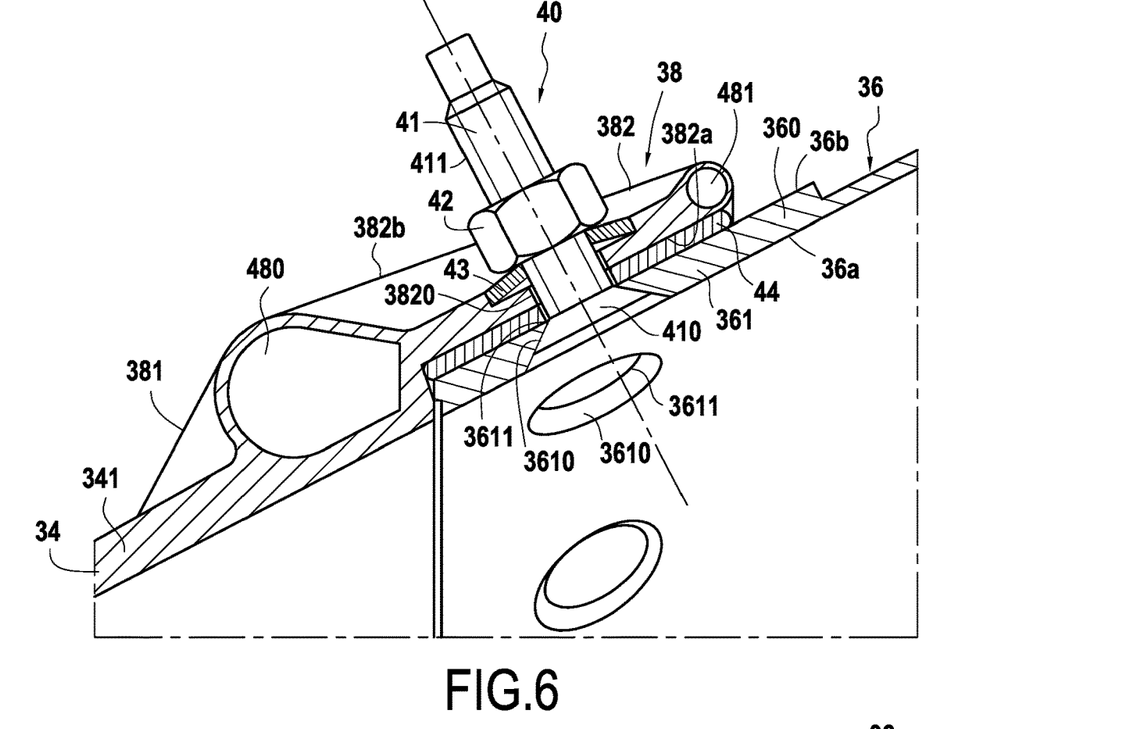
FIGS. 6 and 7 are diagrammatic section views showing the connection between the combustion chamber and the diverging portion of the FIG. 4 nozzle.

More precisely, and as shown in FIG. 6, the second portion 383 of the annular mount 38 is fastened to the wall 360 of the diverging portion 36 by fastener members 40 constituted in this example by bolts 41 and corresponding nuts 42. Each bolt 41 has a conical head 410 that is received in a countersink 3610 present in the inside face 36a of the wall 360 of the diverging portion 36, the shank 411 of the bolt 41 passing both through an orifice 3611 present in the wall 360 and extending the countersink 3610, and also through an orifice 3820 present in the second portion 382 of the annular mount 38. A nut 42 is screwed onto the shank 411 beside the outside face 382b of the second portion 382 of the annular mount. As shown in FIG. 6, a spring washer 43 (or Belleville washer) may be interposed between the nut 42 and the outside face 382b of the second portion 382 of the annular mount 38, in particular in order to limit stresses in the composite material of the wall 360 during expansion of the fastener members 40 and of the second portion 382. A gasket 44, e.g. in the form of a graphite sheet, is interposed between the inside face 382a of the second portion 382 of the annular mount 38 and the outside face 36b of the wall 360 of the diverging portion 36 facing the second portion 382. The mount 38 thus provides a rigid connection between the combustion chamber 34 and the diverging portion 36.

Figure 7:
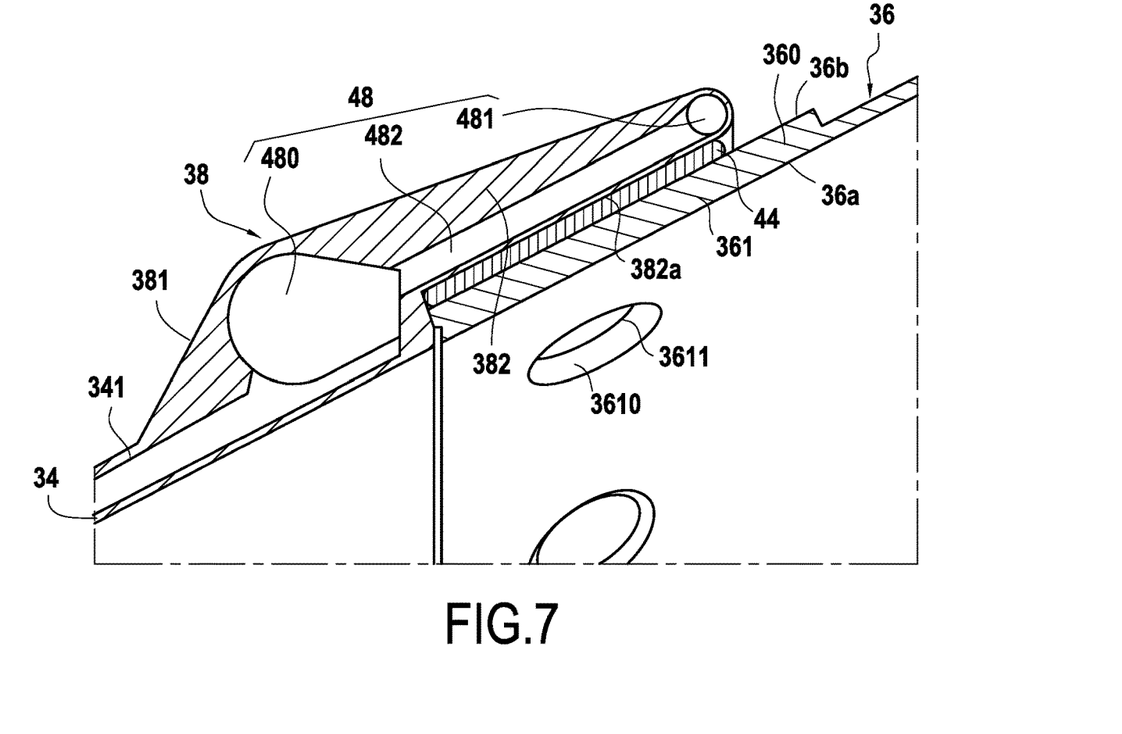

The downstream end 341 of the combustion chamber and the free end of the annular mount 18 also include a cooling circuit 48 for passing a flow of cooling fluid. The cooling circuit 48 in this example comprises a first annular channel 480 for passing a flow of cooling fluid present at the downstream end 341 of the combustion chamber 34 upstream from the fastener members 40, and a second annular channel 481 for passing a flow of cooling fluid that extends along the free end of the second portion 382 of the annular mount 38, the second annular flow channel 382 being present downstream from the fastener members 40. The cooling circuit 48 also includes a plurality of axial ducts 482 communicating with the first and second annular channels 480 and 481. In the presently-described example, two axial ducts 482 are present between two adjacent fastener members 40. Still in the presently-described example, the axial ducts are arranged in stiffeners 50 present on the outside face of the nozzle 30.

The above-described fastener mounts 18 and 38 form a rigid connection between the downstream end of the combustion chamber made of metal material and the upstream end of the diverging portion made of composite material. The second portion 182 or 382 of the annular fastening mount 18 or 38 is fastened directly on the upstream end 161 or 181 of the diverging portion 16 or 367, which end is in the shape of a truncated cone since it corresponds to a portion of the conically-shaped main wall of the diverging portion and not to an additional portion that extends the conically-shaped main wall radially outwards as in Document US 2003/136128.

The diverging portions 16 and 36 are preferably made out of ceramic matrix composite (CMC) material, which, in known manner, is a material made up of carbon or ceramic fiber reinforcement densified by a matrix that is ceramic at least in part, such as one of the following CMC materials:
- carbon/carbon and silicon carbide (C/C—SiC) corresponding to a material made of carbon fiber reinforcement and densified by a matrix comprising a carbon phase and a silicon carbide phase;
- carbon and silicon carbide (C/SiC), which is a material made of carbon fiber reinforcement densified with a matrix of silicon carbide;
- silicon carbide and silicon carbide (SiC/SiC) corresponding to a material made of silicon carbide fiber reinforcement densified by a matrix of silicon carbide; and
- an oxide/oxide type CMC material corresponding to a material made of refractory oxide fiber reinforcement, e.g. made of fibers based on alumina $Al_2O_3$, densified by a refractory oxide matrix.

The diverging portions 16 and 36 could equally well be made of carbon/carbon composite material (C/C), which in known manner is a material made of carbon fiber reinforcement densified by a carbon matrix, and which may optionally be provided with a coating, such as, for example, a deposit of ceramic (e.g. SiC).

By means of the invention, there is no longer any need to make a portion of extra thickness in the composite material of the diverging portion in order to form a flange in the diverging portion, thereby simplifying fabrication of the diverging portion by restricting it to a single fine wall (of "near net shape") and consequently reducing the cost of fabricating the diverging portion. Specifically, because of their central conical shape, the preforms that are to form the diverging portion can easily be stacked in a single densification oven, as described in Documents US 2004/0071877 and US 2015/0152545, thereby serving to reduce the unit cost of fabricating a nozzle.

The invention claimed is:

1. A rocket nozzle presenting a longitudinal axis and comprising both a rocket combustion chamber made of metal material and presenting a downstream end and also a diverging portion made of composite material formed by a wall of conical shape extending between an upstream end and a downstream end, the upstream end of the composite material diverging portion being connected to the downstream end of the rocket combustion chamber; wherein the rocket nozzle further comprises an annular fastener mount made of metal material comprising a first portion that is separate from the combustion chamber and secured to the rocket combustion chamber and a second portion extending beyond the downstream end of the rocket combustion chamber in the direction of the longitudinal axis of the rocket nozzle, the first and second portions of the annular fastener mount being rigidly secured to each other, and wherein the upstream end of the composite material diverging portion is fastened to the second portion of the annular fastener mount by a plurality of fastener members, each comprising a fastener bolt, each fastener bolt passing through the conically-shaped wall of the composite material diverging portion near the upstream end of said wall; wherein the second portion of the annular fastener mount is separate from the rocket combustion chamber and the first portion; and the second portion of the annular fastener mount is fastened to the first portion of the annular fastener mount by fastener members.

2. The rocket nozzle according to claim 1, wherein the rocket combustion chamber includes a cooling circuit for passing a flow of cooling fluid, the cooling circuit comprising at least a first annular channel for passing the flow of cooling fluid extending along the downstream end of the rocket combustion chamber and in the proximity of the fastener members.

3. The rocket nozzle according to claim 1, wherein the rocket combustion chamber includes a cooling circuit for passing a flow of cooling fluid, the cooling circuit comprising at least a first annular channel for passing the flow of cooling fluid extending along the downstream end of the rocker combustion chamber and in the proximity of the fastener members.

4. The rocket nozzle according to claim 1, wherein a gasket is interposed between an inside face of the second portion of the annular mount and an outside face of the wall of the diverging portion.

5. A rocket nozzle presenting a longitudinal axis and comprising both a rocket combustion chamber made of metal material and presenting a downstream end and also a diverging portion made of composite material formed by a wall of conical shape extending between an upstream end and a downstream end, the upstream end of the composite material diverging portion being connected to the downstream end of the rocket combustion chamber; wherein the rocket nozzle further comprises an annular fastener mount made of metal material comprising a first portion secured to the rocket combustion chamber and a second portion extending beyond the downstream end of the rocket combustion chamber in the direction of the longitudinal axis of the rocket nozzle, the first and second portions of the annular fastener mount being rigidly secured to each other, and wherein the upstream end of the composite material diverging portion is fastened to the second portion of the annular fastener mount by a plurality of fastener members, each comprising a fastener bolt, each fastener bolt passing through the conically-shaped wall of the composite material diverging portion near the upstream end of said wall, wherein the annular fastener mount is formed integrally with the rocket combustion chamber, the second portion of the annular fastener mount extending the first portion of said mount, wherein the rocket combustion chamber includes a cooling circuit for passing a flow of cooling fluid, the cooling circuit comprising at least a first annular channel for passing the flow of cooling fluid extending along the downstream end of the rocket combustion chamber and in the proximity of the fastener members, and wherein the first annular channel is upstream from the fastener members and the cooling circuit includes a second annular channel for passing a flow of cooling fluid that extends along a free end of the second portion of the annular mount, said second annular flow channel being present downstream from the fastener members.

6. The rocket nozzle according to claim 5, wherein the cooling circuit includes a plurality of axial ducts communicating with the first and second annular channels, each axial duct being present between two adjacent fastener members.

7. The rocket nozzle according to claim 6, wherein a plurality of stiffeners are present on an outside face of the rocket nozzle, the axial ducts communicating with the first and second annular channels being received in the stiffeners.

* * * * *